United States Patent [19]

Durham

[11] 4,077,634
[45] Mar. 7, 1978

[54] PRESSURE BALANCED METAL TO METAL SEAL

[75] Inventor: Donald F. Durham, Peoria, Ill.

[73] Assignee: Caterpillar Tractor Co., Peoria, Ill.

[21] Appl. No.: 722,445

[22] Filed: Sep. 13, 1976

[51] Int. Cl.² .............................................. F16J 15/38
[52] U.S. Cl. ..................................... 277/92; 277/96.1
[58] Field of Search ................... 277/92, 96.1, 38, 96, 277/93 R, 81 R, 188 R

[56] References Cited

U.S. PATENT DOCUMENTS

| 2,710,206 | 6/1955 | Huber | 277/92 |
| 3,392,984 | 7/1968 | Reinsma et al. | 277/92 |
| 3,403,916 | 10/1968 | Durham et al. | 277/92 |
| 3,452,995 | 7/1969 | Engelking | 277/92 |
| 3,499,653 | 3/1970 | Gardner | 277/96.1 |
| 3,524,654 | 8/1970 | Hasselbacher et al. | 277/38 |

Primary Examiner—Richard E. Aegerter
Assistant Examiner—L. Footland
Attorney, Agent, or Firm—Phillips, Moore, Weissenberger, Lempil & Majestic

[57] ABSTRACT

A seal arrangement is provided having a pair of elastomeric seal rings with a seal band adjacent the innermost diameter of the rings. The seal rings are retained by means of a pair of elastomeric torics, one of which is relatively immovable and the other of which is relatively movable. The movable toric is positioned between supporting structure incorporating ramps of low angle, which improves the pressure, velocity relationships of the seal and permits operation at higher speeds. Retention of the other toric stabilizes the seal and prevents cocking or tilting of the rings so as to maintain the sealing plane perpendicular to the rotational axis. An arrangement is thus provided wherein the seals are of nearly equal surface area which produces pressure balanced seals and a more constant, level force along the axis.

7 Claims, 2 Drawing Figures

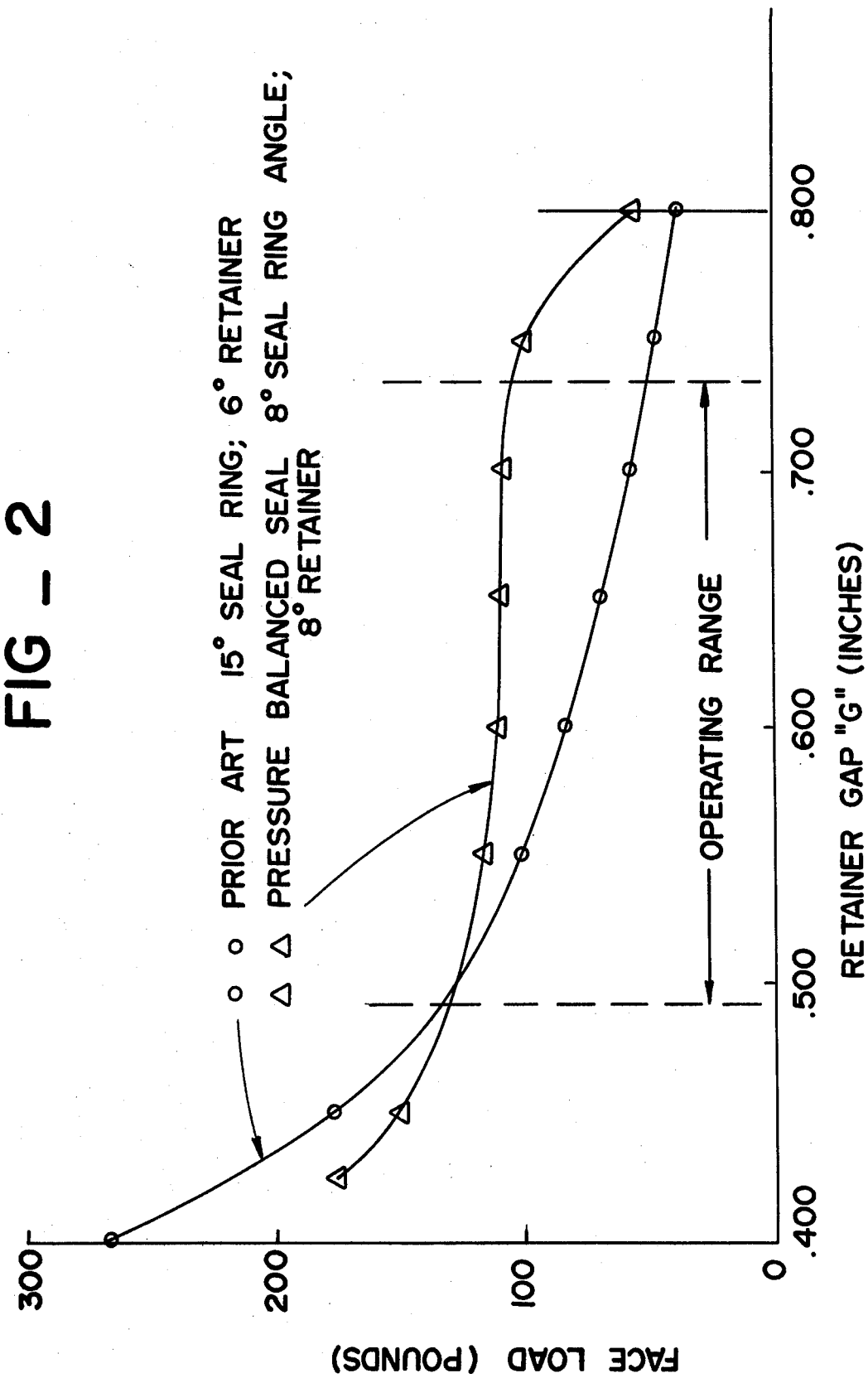

PRESSURE BALANCED METAL TO METAL SEAL

BACKGROUND OF THE INVENTION

The present invention relates to seals, and particularly to metal face seals.

The present invention has particular application to the earthmoving and heavy equipment vehicle field, wherein seals are operated in highly destructive or abrasive environments. The invention has particular application to use of wheels on large off-road vehicles such as trucks.

The type of environment thus described creates seal problems and has resulted in some solutions. For example, Hasselbacher et al, U.S. Pat. No. 3,524,654, shows a prior art metal to metal face seal especially suited to such environments, and which has received a certain degree of success. Another example is Durham et al, U.S. Pat. No. 3,403,916, showing a multiple seal arrangement of a metal to metal type. Both of these examples show metal to metal face seals which are retained by elastomeric torics and are contained between inclined ramps of retainer structures. These seals are especially suited to application to crawler tractors and the bearings thereof, wherein vehicle speeds and seal ring diameters are relatively small compared with those encountered on truck vehicles. As the seal diameter increases, the surface velocity at the seal face increases, thus increasing heat and centrifugal force problems. In addition, the seals tend to tilt from the plane perpendicular to the rotational axis, thus resulting in instability.

One solution to some of these problems is shown in Maguire et al, U.S. Pat. No. 3,905,607, wherein a single seal ring is employed for sealing against a relatively movable seal ring. The single seal ring is biased by means of the toric. However, this arrangement is not entirely satisfactory in view of the fact that the arrangement thus described is not pressure balanced.

SUMMARY AND OBJECTS OF THE INVENTION

In accordance with the present invention, an improved seal arrangement is provided including a pair of metal to metal seal rings having axially disposed seal faces and a sealing ring at the innermost minimum diameter of the seal faces. The seal rings are mounted by means of a pair of elastomeric torics, one of which is contained between inclined ramps of a support structure, and the other of which is relatively immovable. The inclined ramps are of relatively low angle and are equal so that face loading on the seal is relatively constant over a long operating range.

It is therefore the primary object of this invention to provide an improved seal ring of the metal to metal type.

It is a further object to provide seal rings with substantially constant and level face loading.

It is a further object to provide seal rings which are pressure balanced and wherein the face loading thereof is not affected by pressure surges.

It is a further object to provide metal to metal face seals having face loading of a level and constant nature over a range of retainer gap.

Further and other objects and advantages of this invention will become more readily apparent from a review of the following description and accompanying drawings.

DETAILED DESCRIPTION

Figure 1:
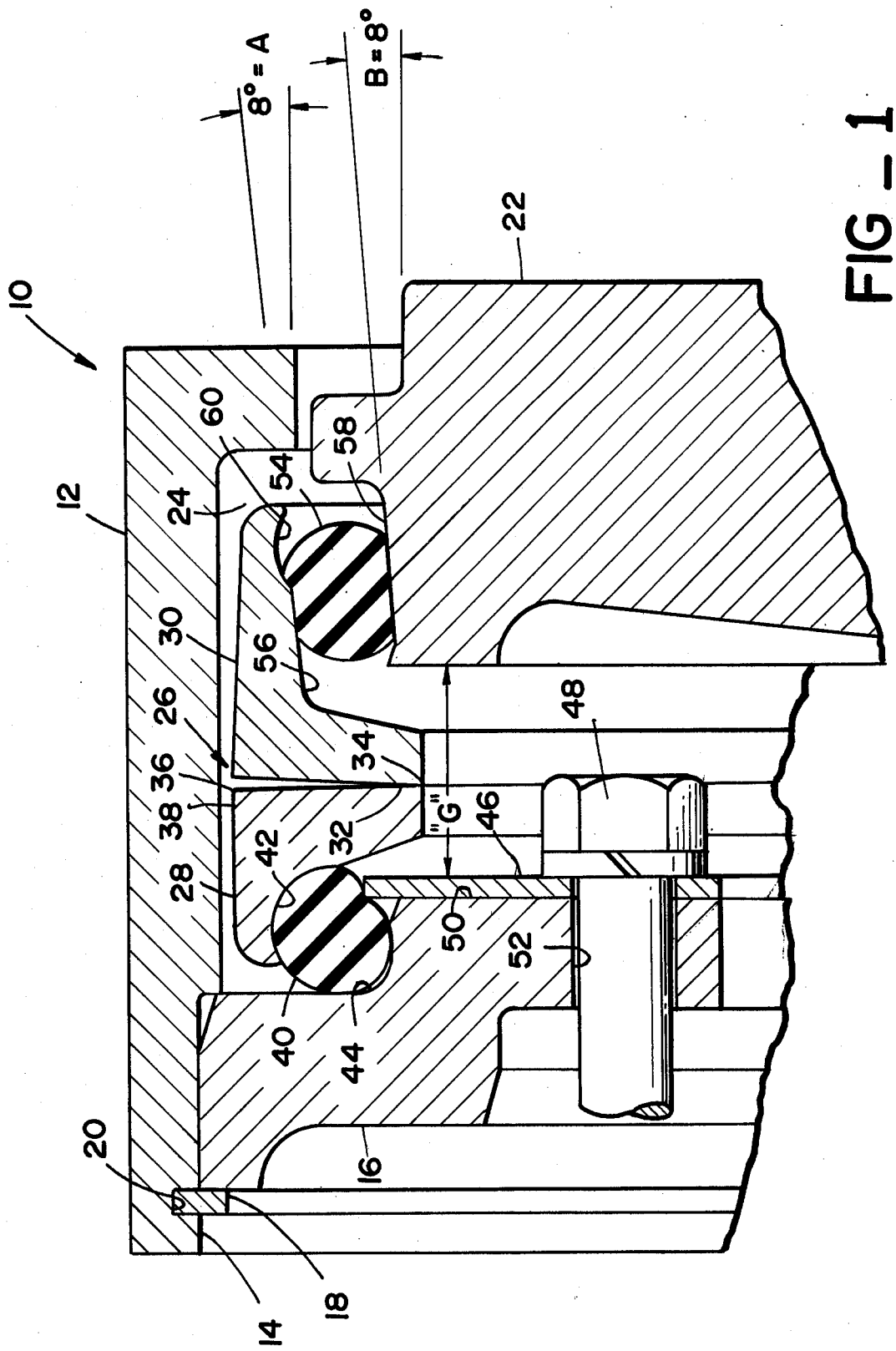
FIG. 1 is an elevational view in cross section of a portion of a truck axle assembly incorporating a seal in accordance with the present invention; and, FIG. 2 is a graphic representation of the performance of the seal of the instant invention relative to prior art seal rings.

Turning to FIG. 1, there is shown a partial cross sectional view of a truck rear wheel assembly shown generally at 10. The assembly comprises a relatively rotating member,' housing 12,' which is generally cylindrical in shape. Within the external, generally cylindrical portion 14 thereof is a generally ring-shaped retainer 16 held by means of a snap ring 18 within an accommodating groove 20. The assembly further comprises a second retainer, which is also generally ring-shaped, and denoted 22. Second ring-shaped retainer 22 may conveniently be an axle flange attached to an axle (not shown).

A seal cavity 24 is defined by the thus described structure and contains a seal ring pair 26 comprised of first and second metal to metal seal rings 28,30, respectively.

The seal rings are of generally annular or ring shape configuration, having a seal band 32 of some predetermined width at their radially outermost diameter 34 and a V-shaped gap 36 opening outwardly at the radially innermost diameter 38.

The seal rings are nearly identical in cross sectional shape and produce a pressure balanced effect whereby pressure surges of sealing fluid contained within the gap 36 would be nearly equally distributed.

First seal member or ring 28 is supported by means of a relatively stationary toric ring of elastomeric material denoted 40. The first seal ring 28 contains a groove 42 of annular shape for accommodating toric 40. The toric is further retained and compressed within annular notch 44 and retainer 16 by means of a ring-shaped retainer ring 46 which is held by means such as bolt means 48 against face 50 of retainer 16. Bolt means 48 is threaded through a bore 52 in retainer 16 and secured in threads (not shown). It is to be understood that only a single one of a plurality of such bolt means is shown.

Turning to second seal ring 30, it is similarly supported by means of a resilient elastomeric toric 54 identical with toric 40. The second toric, however, is contained between a pair of ramps 56,58, making an angle A and B, respectively, with the wheel assembly axis. A rollout groove 60 is further provided in seal 30 to assist in installation of the rings in the conventional fashion. The particular seal ring structure shown enables the selection of relatively low angle ramp angles such as $A=8°$ and $B=8°$ shown.

Turning to FIG. 2, the instant invention is compared with a prior art seal ring wherein the seal ring or A angle is equal to 15°, whereas the retainer, or B angle, is equal to 6°. As may be seen in FIG. 1, a retainer gap G is defined between the retainer ring 46 and retainer 22. Turning again to FIG. 2, it is seen that the instant inventive seal ring assembly produces a relatively constant and level face load over an operating range of between about 0.5 and 0.75 inches.

It is to be understood that the foregoing description is merely illustrative of a preferred embodiment of the invention and that the scope of the invention is not to be limited thereto, but is to be determined by the scope of the appended claims.

What is claimed:

1. In combination with a pair of relatively rotatable members, a seal assembly comprising:
    a pair of seal rings having means defining axially disposed seal faces disposed on each of said rings,
    each of said seal faces having means defining a narrow seal band thereon,
    first mounting means securing one of said rings to one of said members,
    second mounting means securing the other of said rings to the other of said members,
    one of said mounting means including loading means for applying a face load to said seal rings,
    said loading means including a pair of opposed conical ramps and a first resilient toric compressed between the ramps,
    the other of said mounting means including a second resilient toric compressed between an annular groove in the other of said members, and a retainer opposite to said annular groove so as to prevent relative axial movement of said second resilient toric with respect to the other of said mounting means and wherein said ramps define angles with respect to the axis of said rings and wherein said angles are substantially 8°.

2. The invention of claim 1 wherein said retainer comprises an annular retainer ring and means mounting said retainer ring.

3. The invention of claim 2 wherein said means mounting said retainer ring comprises bolt means.

4. The invention of claim 1 wherein one of said ramps is formed in one of said rings and the other of said ramps is formed on one of said rotatable members.

5. The invention of claim 2 wherein said retainer is fixedly mounted to one of said relatively rotatable members by said retainer mounting means.

6. The invention of claim 1 wherein a first one of said ramps is formed in one of said rings and a second one of said ramps is formed on one of said relatively rotatable members.

7. The invention of claim 1 wherein said seal faces are disposed at the innermost minimum diameter of each of said rings and wherein said seal band is located at the innermost diameter thereof.

* * * * *